United States Patent
Creamer et al.

(10) Patent No.: US 7,962,448 B2
(45) Date of Patent: Jun. 14, 2011

(54) OPTIMIZING A THREE TIERED SYNCHRONIZATION SYSTEM BY PRE-FETCHING AND PRE-FORMATTING SYNCHRONIZATION DATA

(75) Inventors: Thomas E. Creamer, Boca Raton, FL (US); Curtis E. Hrischuk, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/015,182

(22) Filed: Dec. 17, 2004

(65) Prior Publication Data

US 2006/0136518 A1 Jun. 22, 2006

(51) Int. Cl.
*G06F 17/30* (2006.01)

(52) U.S. Cl. ........ 707/611; 707/613; 707/617; 707/618; 707/620; 707/624; 707/634; 707/636; 707/637; 707/638; 707/640; 707/661; 707/674; 707/825; 707/829; 705/2; 709/211; 709/219

(58) Field of Classification Search ................. 707/201, 707/100, 204, 613, 617, 618, 620, 624, 634, 707/635, 636, 637, 638, 640, 661, 674, 825, 707/829, 999.01, 999.202, 999.204; 705/2; 709/211, 219

See application file for complete search history.

(56) References Cited

U.S. PATENT DOCUMENTS

| | | | | |
|---|---|---|---|---|
| 5,862,346 A * | 1/1999 | Kley et al. | ...................... | 709/245 |
| 5,950,198 A * | 9/1999 | Falls et al. | .......................... | 707/8 |
| 6,044,381 A * | 3/2000 | Boothby et al. | .............. | 707/201 |
| 6,247,135 B1 * | 6/2001 | Feague | .......................... | 713/400 |
| 6,411,966 B1 * | 6/2002 | Kwan et al. | .................... | 707/201 |
| 6,745,209 B2 * | 6/2004 | Holenstein et al. | ........... | 707/203 |
| 6,880,051 B2 * | 4/2005 | Timpanaro-Perrotta | ...... | 711/162 |
| 2003/0087219 A1 * | 5/2003 | Berger et al. | ................. | 434/118 |
| 2003/0105857 A1 | 6/2003 | Kamen et al. | | |
| 2003/0115301 A1 | 6/2003 | Koskimies | | |
| 2003/0126162 A1 | 7/2003 | Yohe et al. | | |
| 2003/0145020 A1 * | 7/2003 | Ngo et al. | ..................... | 707/201 |
| 2003/0212826 A1 | 11/2003 | Rapakko et al. | | |
| 2004/0036812 A1 | 2/2004 | Ueda et al. | | |
| 2004/0044702 A1 * | 3/2004 | Ferreira Alves et al. | ...... | 707/203 |
| 2004/0225693 A1 * | 11/2004 | Ganji et al. | .................... | 707/201 |
| 2005/0060435 A1 * | 3/2005 | Xue et al. | ...................... | 709/248 |
| 2005/0228808 A1 * | 10/2005 | Mamou et al. | ................. | 707/100 |
| 2006/0080362 A1 * | 4/2006 | Wagner et al. | ................ | 707/200 |
| 2006/0106806 A1 * | 5/2006 | Sperling et al. | ................. | 707/10 |

* cited by examiner

*Primary Examiner* — Syling Yen

(74) *Attorney, Agent, or Firm* — Novak Druce + Quigg LLP

(57) ABSTRACT

A three tiered data synchronization system including a client, an enterprise data server, a synchronization server, and a pre-fetch data store. The client can have an associated client data store and the enterprise data server can have an associated server data store. The synchronization sever can intermittently and bidirectionally synchronize data within the client data store with data within the server data store. The pre-fetch data store can maintains data specific to synchronization requests that is used by the synchronization server when performing synchronization operations responsive to detected synchronization requests. The data specific to synchronization request used by the synchronization server is stored within the pre-fetch data store before the corresponding synchronization requests are detected by the synchronization server.

18 Claims, 2 Drawing Sheets

OPTIMIZING A THREE TIERED SYNCHRONIZATION SYSTEM BY PRE-FETCHING AND PRE-FORMATTING SYNCHRONIZATION DATA

BACKGROUND

1. Field of the Invention

The present invention relates to data store synchronization or computer networking and, more particularly, to a technique for optimizing a three tiered synchronization system by pre-fetching and pre-formatting synchronization data.

2. Description of the Related Art

Handheld devices are commonly synchronized with a remotely located computer so that email, contact information, calendar events, tasks, and the like are consistent between the handheld device and the computer. Conventionally, a three tiered approach is taken to synchronize the data on the handheld device. In the three tiered approach, a synchronization client residing on the handheld device connects to an intermediate server called a synchronization server, which in turn connects to a personal information management (PIM) server or other data server that resides on the remotely located computer.

More specifically, synchronization operations are typically controlled by the synchronization client that uses a well defined communication protocol, such as SyncML, to convey a synchronization request to the synchronization server. The synchronization server connects to the PIM server to query whether the PIM server includes data more current than the data which resides in the synchronization client. When data needs to be updated, the data is retrieved by the synchronization server from the PIM server and conveyed to the synchronization client. Similarly, the synchronization server can query the synchronization client for updated information and can convey any updated data found from the synchronization client to the PIM server as appropriate. Since both data stores can be updated during synchronization, the described process can be considered a bidirectional synchronization technique.

A conventional three tiered approach does not scale well. Operations performed by the synchronization server and the PIM server are performed in a client driven matter. When many clients request synchronization at approximately the same time, each requesting client contends for synchronization server and PIM server resources, which results in bottlenecks at each server and an increased response time for each user.

The type of problems experienced by a conventional approach to synchronization can be illustrated by example. Assume that between 8:00 AM and 8:15 AM four hundred executives having handheld devices arrive at their office. All of the four hundred executives check their email within fifteen minutes of arrival, three hundred through their workstations and one hundred through their handheld devices using an Extended Service Set (ESS) based system. This normally occurring morning usage spike pushes the PIM server utilization (for the PIM server that synchronizes with both an email server and a synchronization server) to over eighty percent. The synchronization server similarly experiences a usage spike, which can be worsened as the queries from the synchronization server are often queued at the PIM server, resulting in idle wait cycles at the synchronization server. Consequently, client synchronization, which is normally slow, functions at least five times slower than other points of the day.

The client response time, results in may frustrated executives, who reset synchronization tasks out of a desire to "speed things up", which results in even greater system delays. Accordingly, synchronization operations, which typically take about ten minutes, now take over fifty minutes, which many executives feel is unacceptably slow, resulting in complaints, purchases of additional servers to increase synchronization speed, purchases of new handheld devices (which fails to resolve the problem since the bottlenecks occur at the servers), and similar expensive and/or ineffective attempted solutions. What is needed is a more scalable methodology for synchronizing handheld devices that results in less dramatic usage spikes, which in turn results in fewer server bottlenecks and user experienced delays.

SUMMARY OF THE INVENTION

The present invention can be expressed in various aspects and embodiments and can be construed as having a scope which is defined by the claim section included herein. In accordance with one aspect of the present invention, a three tiered data synchronization system includes a client, an enterprise data server, a synchronization server, and a pre-fetch data store. The client can have an associated client data store and the enterprise data server can have an associated server data store. The synchronization sever can intermittently and bidirectionally synchronize data within the client data store with data within the server data store. The pre-fetch data store can maintain data specific to synchronization requests that are used by the synchronization server when performing synchronization operations responsive to detected synchronization requests. The data specific to synchronization requests used by the synchronization server is stored within the pre-fetch data store before the corresponding synchronization requests are detected by the synchronization server.

Another aspect of the present invention can include a computerized method for synchronizing two data stores in a three tiered synchronization system, which includes a client, a synchronization server, and a data server. Before a synchronization request is detected, the synchronization server can retrieve data needed for handling the synchronization request. The data can be retrieved from a data store associated with the client and/or can be retrieved from a data store associated with the data server. The synchronization server can store the retrieved data in a pre-fetch data store. Subsequently, the synchronization server can detect the synchronization request. The synchronization server can handle the synchronization request utilizing data that was previously placed within the pre-fetch data store.

It should be noted that the invention can be implemented as a program for a controlling computer to implement the functions described herein, or as a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

DETAILED DESCRIPTION OF THE INVENTION

Figure 1:
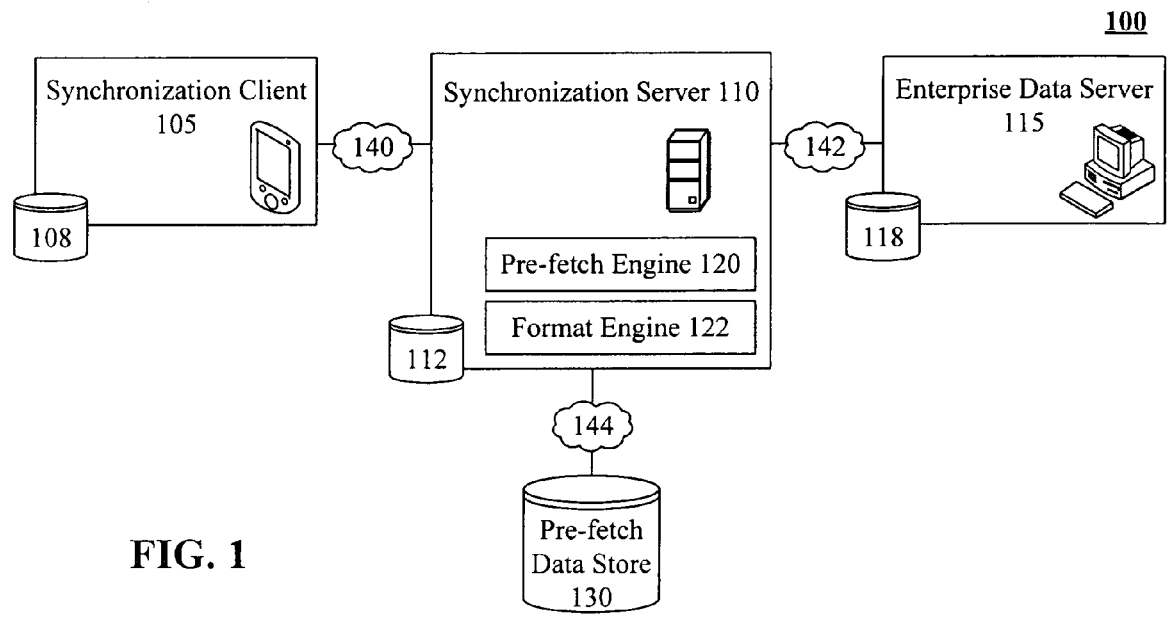
FIG. 1 is a schematic diagram illustrating a three tiered synchronization system in accordance with an embodiment of the inventive arrangements disclosed herein.

Inventive arrangements detailed herein teach a system, method, and apparatus that decrease response time for processing synchronization requests in a three tiered synchronization system 100 while increasing the number of users that a single server or central processing unit (CPU) can handle. These gains are achievable by pre-fetching and pre-formatting synchronization updates using otherwise idle server resources. Pre-fetched and preformatted data can be stored within a pre-fetch data store 130 until needed.

More specifically, a synchronization server 110 can retrieve data to update (pre-fetch) from an enterprise data server 115 before a synchronization client 105 submits a synchronization request. The synchronization server 110 can also format (pre-format) the pre-fetched data so that the data is ready for communication to the client 105 upon demand. Consequently, when synchronization is initiated by the client 105, the backend (enterprise data server 115) latency is eliminated and a large portion of the middleware (synchronization server 110) service time is reduced. Notably, the synchronization server 110 can also pre-fetch data from the client 105, place the received data in the pre-fetch data store 130, and use that data when updating data store 118 of the enterprise data server 115 based upon content of data store 108.

FIG. 1 is a schematic diagram illustrating a three tiered synchronization system 100 in accordance with an embodiment of the inventive arrangements disclosed herein. As illustrated, system 100 can include the synchronization client 105, the synchronization server 110, and the enterprise data server 115.

The synchronization client 105 can be a client application on a computer device having an associated data store 108. The data store 108 can be intermittently synchronized with a data store 118 of the enterprise data server 115. Accordingly, the synchronization client 105 can represent a front-end component that is linked to a back end component (enterprise data server 115). While the synchronization client 105 can be any type of application residing on any platform or computing device, the synchronization client 105 is often a component of a contact management application residing on a handheld device, such as a personal data assistant (PDA), a mobile telephone, a portable media player, a computer tablet, and the like. For example, the synchronization client 105 can include PALM PIM applications for contacts, calendars, and tasks.

The enterprise data server 115 can include a server application on a computing device having an associated data store 118. The enterprise data server 115 can include a standalone application, like a Desktop PIM application, and can also include a backend system that provides data services for a networked management information system. For example, the enterprise data server 115 can include a LOTUS DOMINO server from International Business Machine Corporation (IBM) of Armonk, N.Y., a NOVELL GROUPWISE server from Novell Inc. of Waltham, Mass., and the like.

The enterprise data server 115 can be configured in accordance with a number of different synchronization technologies that permit the data in data store 108 to synchronize with data in data store 118 in a bidirectional fashion. For example, in different embodiments of the present invention, the enterprise data server 115 can include a PIM server, a relational database server, a form server, and other types of bidirectional data servers.

As used herein, a PIM server is a server designed to provide contact information such as calendar entries, tasks, address information, and the like to one or more synchronization clients 105. Commonly, a PIM server can be located upon a desktop machine and the synchronization clients 105 can be located within one or more mobile devices. It is also common for the PIM server to be an enterprise server that serves PIM information to a plurality of desktop machines and mobile client devices. In certain embodiments, the PIM server (or other type of enterprise data server 115) can be implemented as multiple cloned servers to reduce processing bottlenecks and/or to provide a level of redundancy so that if a primary server fails, server operations can be performed by a backup server.

The PIM server (or other type of enterprise data server 115) can be configured to automatically synchronize itself with one or more synchronization clients 105 in accordance with client-specific settings. Each of the client-specific settings can specify a synchronization level, a synchronization frequency, and other client-specific integration parameters. Client specific settings can be stored in data store 108 and/or data store 112.

For example, the PIM server can be configured to synchronize scheduling data, calendaring information, and contact information including street addresses on a daily basis between an internal data store and a corresponding data store of a PDA. The same PIM server can be configured to synchronize contact information including email addresses and phone numbers on a weekly basis between an internal data store and a corresponding data store of a mobile telephone, which is a different synchronization client 105 from the PDA that is utilized by the same user and is synchronized to a data store of the same PIM server.

Technology used by a relational database server is similar to that used by a PIM server in that changes are allowed to be independently made within a data store 118 associated with the relational database server or within a data store 108 associated with the synchronization client 105. From time to time, the client 105 can be communicatively linked to the relational database server and information can be reconciled or updated in a bidirectional manner. The information stored in the synchronized data stores can include any type of information and is not limited to contact information typical of a PIM server.

As used herein, the form server can be a server associated with Web-based forms. The form server can permit users to fill out forms while online as well as provide off-line forms which can be filled out at user convenience when the user is not directly connected to the form server. When the enterprise data server 105 is a form server, the synchronization server 110 can adapt information contained within off-line forms to information required for forms of the form server.

Notably, a data store 108 associated with a completed offline form can contain different information in a slightly different format than that contained in data store 118 corresponding to an online form associated with the form server. For example, an administrator can alter the format of a form within a form server causing it to be somewhat different than a corresponding completed offline form, which has been previously provided to a user and which does not include the administrator-made changes. In another example, one or more generic offline forms can be used to automatically fill-in commonly requested fields within specific forms of the form server. That is, offline forms can include commonly requested user information like name, email address, and telephone number that is automatically provided to a form server when requested so as to save a user time.

The synchronization server 110 can include middleware within the three tiered system 100 that coordinates synchronization operations between the synchronization client 105 and the enterprise data server 115. The synchronization server 110 can include an enterprise server like a DOMINO EVERYPLACE server from IBM or SUREWAVE ENTERPRISE server from JP Mobile Incorporated of Dallas, Tex. The synchronization server 110 can also include a small office or desktop server that uses such applications as EASYSYNC from IBM, INTELLISYNC from Intellisync Corporation of San Jose, Calif., and HOTSYNC from Palm One Incorporated of Milpitas, Calif.

The synchronization server 110 can be configured for automatic or manual synchronization operations that are initiated by either the synchronization client 105 or the enterprise data server 115. Additionally, the synchronization server 110 can synchronize multiple synchronization clients 105 to multiple enterprise data servers 115. For example, the synchronization server 110 can synchronize a portion of data store 108 with data within data store 118 and a different portion of data store 108 with a data store (not shown) associated with a different data server (not shown). Moreover, the synchronization server 110 can synchronize the synchronization client 105 with multiple data servers simultaneously in a user transparent fashion.

Additionally, the synchronization server 110 can be implemented as a centralized computing device or as a group of distributed communicatively linked computing devices. The synchronization server 110 can also include land based communication ports and one or more wireless transceivers that function as access points (APs) for wireless communications. For example, the synchronization server 110 can include one or more strategically placed access points (APs) in accordance with established protocols, such as the extended service set (ESS) protocol.

It should be appreciated that while system 100 can utilize any suitable standard when synchronizing data between the synchronization client 105 and the enterprise data server 115, open and portable standards, such as SyncML, can be advantageously utilized in certain arrangements of the present invention to promote consistent synchronization of remote data across several networks, platforms, and devices.

The synchronization server 110 can include a data store 112 of synchronization parameters, a pre-fetch engine 120, and a format engine 122. The synchronization parameters of data store 112 can be synchronization client 105 or user specific parameters that establish the frequency of automated synchronization occurrences, details pertaining to which data within data stores 108 and 118 are to be synchronized, data migration parameters for porting data between the data stores, data formatting parameters, and the like. In one embodiment, the parameters of data store 112 can be user configurable parameters so that an administrator of the synchronization server 110 or other authorized user can adjust synchronization behavior.

The synchronization parameters can affect the manner in which the synchronization server 110 performs pre-fetching operations and the manner in which the synchronization server 110 utilizes data in the pre-fetch data store 130. For example, in one embodiment, the synchronization server 110 can automatically query data store 108, data store 118, and combinations thereof in a fashion indicated by the synchronization parameters. In another example, synchronization parameters can permit some tasks or synchronization operations to have priority over others. That is, the synchronization parameters in data store 112 can grant one set of clients 105, users, or synchronization tasks priority over a similar set. In such a fashion, for example, a group of power users can have priority over other users so that data for the power users is pre-fetched and pre-formatted before data for other users is pre-fetched and pre-formatted.

The pre-fetch engine 120 can retrieve data needed to handle synchronization requests before the synchronization requests are submitted to the synchronization server 110. The pre-fetch engine 120 can operate in accordance with previously established conditions so that it unobtrusively performs pre-fetching operations, whenever computing resources of the synchronization server 110 (as well as resources of the synchronization client 105, enterprise data server 115, and/or networks 140, 142, 144) are available. Consequently, the pre-fetching operations can have little to no adverse affect other tasks (tasks besides pre-fetching/pre-formatting tasks) performed by components of system 100.

The format engine 122 can format data contained in the pre-fetch data store 130 for the data conventions established for a receiving data store. For example, when data from data store 118 is retrieved by the synchronization server 110 so that the retrieved data can be used to update data store 108, the format engine 122 can format the retrieved data in accordance with data conventions of data store 108 before storing the data in the pre-fetch data store 130. Similarly, the format engine 122 can format data intended for data store 118 in accordance to the data conventions of data store 118.

The format engine 122 can perform operations in sequence with the pre-fetch engine 120 so that each time information is pre-fetched it can be appropriately formatted before being placed in the pre-fetch data store 130. Alternately, the format engine 122 can operate independent of the pre-fetch engine 120. For example, the pre-fetch engine 120 can place data in the pre-fetch data store 130, which can be marked as being formatted or unformatted. The format engine 122 can then query the pre-fetch data store 130, when resources permit, and retrieve data marked as unformatted. The format engine 122 can format the retrieved data, place the data back in the pre-fetch data store 130, and mark the returned data as formatted.

It should be noted that networks 140, 142, and 144 can be implemented in any of a variety of fashions so long as content is conveyed using encoded electromagnetic signals. Further, any of a variety of communication devices, such as customer premise equipment (CPE), computers, modems, routers, switches, access points, or the like, can be included within networks 140, 142, and 144.

Each of the networks 140, 142, and 144 can convey content in a packet-based or circuit-based manner. Additionally, each of the networks 140, 142, and 144 can convey content via landlines or wireless data communication methods. For example, each of the networks 140, 142, and 144 can separately include an Intranet, a local area network, a wide area network, or a combination thereof In another example, each of the networks 140, 142, and 144 can include a telephony network, like a mobile wireless network or a public switched telephone network (PSTN).

The data stores 108, 112, 118, and 130 can store information in any recording medium, such as a magnetic disk, an optical disk, a semiconductor memory, or the like. Further, each of the data stores 108, 112, 118, and 130 can utilize any information retention technique including a file-based storage technique or a database storage technique. Moreover, each of the data stores 108, 112, 118, and 130 can be a storage area fixed to a geographical location or a storage area distributed across a network space. Moreover, each of the data stores 108, 112, 118, and 130 can be a storage area fixed to a geographical location or a storage area distributed across a network space. Additionally, each of the data stores 108, 112, 118, and 130 can represent a persistent memory region, such as hard drive memory space, as well as a volatile memory region, such as random access memory (RAM) memory space.

It should be appreciated that the arrangements shown in FIG. 1 are for illustrative purposes only and that the invention is not limited in this regard. The functionality attributable to the various components can be combined or separated in different manners than those illustrated herein. For instance, the parameter data store 112 can be implemented as a segment of the pre-fetch data store 130. In another embodiment of the present invention, the pre-fetch engine 120 and the format engine 122 can be integrated as a single software component.

Figure 2:
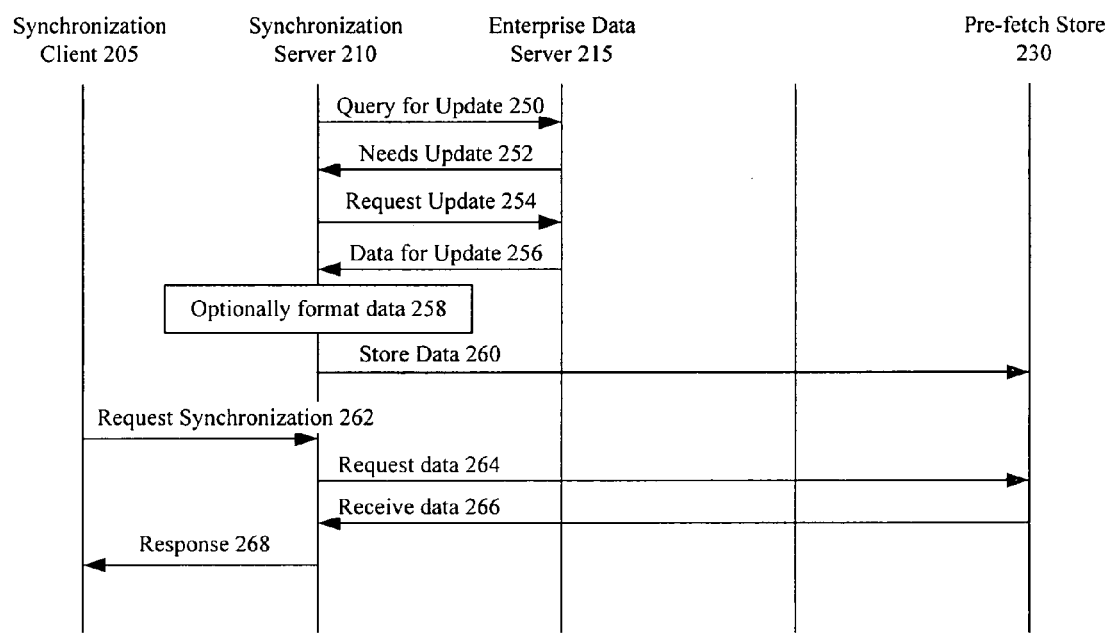
FIG. 2 is a process flow diagram illustrating a flow of information in the performance of a synchronization of data stores in accordance with an embodiment of the inventive arrangements disclosed herein.

FIG. 2 is a process flow diagram illustrating a flow of information in the performance of a synchronization of data stores in accordance with an embodiment of the inventive arrangements disclosed herein. The flow of information can include a synchronization client 205, a synchronization server 210, an enterprise data server 215, and a pre-fetch store 230. The synchronization can be performed in the context of any three tiered synchronization system, such as the system 100 of FIG. 1. Accordingly, the synchronization client 205 can be configured similar to synchronization client 105; synchronization server 210 can be configured similar to synchronization server 110, enterprise data server 215 can be configured similar to enterprise data server 115, and pre-fetch store 230 can be configured similar to pre-fetch data store 130.

The synchronization server 210 can pre-fetch and/or pre-format data by querying the enterprise data server 215, synchronization client 205, or combinations thereof intermittently as processing resources permit. For example, process flows 250-260 illustrate an operation where the synchronizer 210 queries the enterprise data server 215 to receive data for updating the synchronization client 205, data which is stored in the pre-fetch store 230 until it is needed. The data in the pre-fetch store 230 can be used to respond to synchronization requests as shown by process flows 262-268. Process flows 250-260 can iteratively occur in an asynchronous fashion to process flows 262-268.

To illustrate the pre-fetching of data, in flow 250, the synchronization server 210 can query the enterprise data server 215 for updates. In flow 252, the enterprise data server 215 can indicate that data has been updated. In response, as shown by flow 254, the synchronization server 210 can request an update 254. In flow 256, data for the update can be conveyed from the enterprise data server 215 to the synchronization server 210. In one embodiment, the conveyed data can include only the information that has changed within the enterprise data server 215. In another embodiment, the conveyed data can include all pertinent information for responding to the query that is contained within the enterprise data server 215.

Once the synchronization server 210 receives the data from the enterprise data server 215, the synchronization server 210 can optionally format the data, as shown by flow 258. In flow 260, data fetched by the synchronization server 210 can be stored in pre-fetch store 230.

It should be appreciated that the optional formatting of flow 258 is in accordance to the data format used by entity that is to receive the data update. Formatting of data can be beneficial in situations where the enterprise data server 215 stores information in a different format and/or according to different data storage conventions than those used by the synchronization client 205. By storing data in the pre-fetch store 230 in a suitable format for delivery, the stored data can be immediately conveyed to the synchronization client 205 from the pre-fetch store 230 without the delay and without the synchronization server 210 consuming resources at the time that response to a request is generated.

To illustrate the utilization of pre-fetched data, in flow 262, the synchronization client 205 can convey a synchronization request to the synchronization server 210. The synchronization server 210 can, in flow 264, request data from the pre-fetch store 230. In flow 266, the requested data can be received by the synchronization server 210 from the pre-fetch store 230. In flow 268, the synchronization server 210 can generate a response based upon the received data and convey the response to the synchronization client 205.

Figure 3:
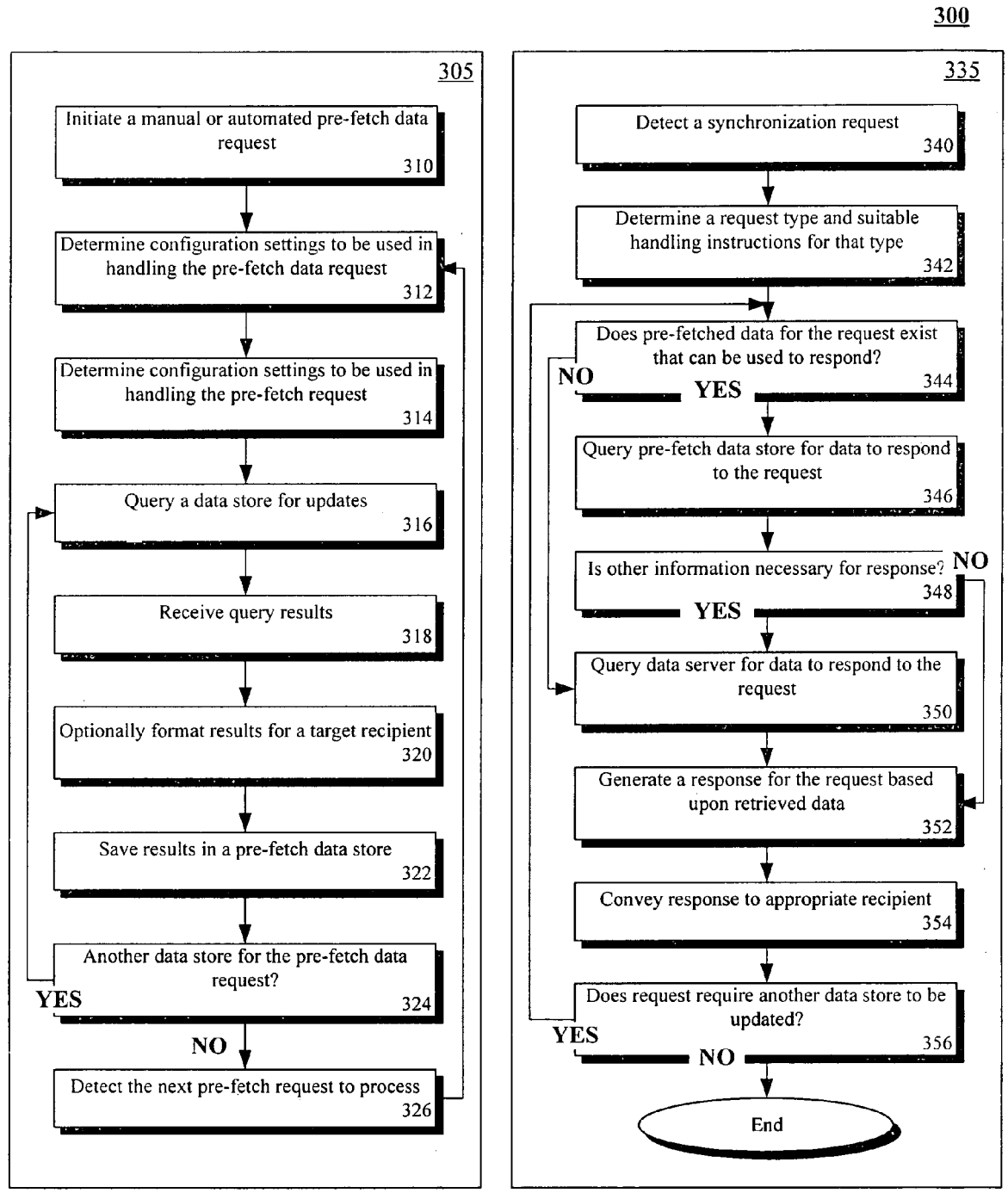
FIG. 3 is a flow chart illustrating a method of synchronizing data stores in accordance with an embodiment of the inventive arrangements disclosed herein.

FIG. 3 is a flow chart illustrating a method 300 of synchronizing data stores in accordance with an embodiment of the inventive arrangements disclosed herein. The method 300 can be performed in the context of any three tiered synchronization system, such as system 100 of FIG. 1. Method 300 includes two different processes 305 and 335 that can be performed asynchronously. Process 305 pre-fetches data from data stores and places it within a pre-fetch data store. Process 335 utilizes the data within the pre-fetch data store to generate responses to synchronization requests.

Process 305 can begin in step 310, where a manual or automated pre-fetch data request can be initiated. In step 312, a parameter data store having a plurality of previously established configuration settings can be accessed. Notably, the parameter data store can associate different configuration settings with different types of data requests so that manual and automated requests can be handled differently. Manual requests can force an immediate update from a synchronized data store (like the server data store) in situations were data currency is critical and where the slightly outdated information that may already reside in the pre-fetch data store is not sufficient. The configuration settings of the parameter data store can be specific to particular to a client, a data server, or a combination of the two. In step 314, the determination settings for the pre-fetch request can be determined and appropriate synchronization server settings can be established.

In step 316, one of the data stores to be synchronized can be queried for updates. In step 318, the synchronization server can receive the query results. In step 320, the results can be optionally formatted for the data conventions of an intended result recipient. In step 322, the results, which may be formatted, can be saved to a pre-fetch data store. In step 324, a determination can be made as to whether additional data stores need to be queried to handle the request.

It should be appreciated that most synchronization requests require a bidirectional update to occur between two or more data stores. Thus, each of the two or more data stores may need to be queried for updates. In particular embodiments, even though a synchronization request requires bidirectional updates, the pre-fetching can be uni-directional. That is, for updates in one direction, data within the pre-fetch data store can be maintained while no data is maintained for updates in the other direction.

When another data store is to be utilized for the pre-fetch data request, the process 305 can loop from step 324 to step 316 where the new data store is queried for updates. When no additional data stores are to be utilized, the process can proceed from step 324 to step 326. In step 326, the synchronization server can detect the next pre-fetch request to process. It should be noted that multiple pre-fetch requests can be queued by the synchronization server that may be configured to handle requests as resources permit. Moreover, when requests are queued, a prioritization scheme can be used to prefer particular ones of the queued requests over others. Once the next request has been determined, the process can proceed from step 326 to step 312, where configuration settings for the next request can be determined.

Process 335 can begin in step 340, where a synchronization request can be detected. In step 342, a request type of the synchronization request can be determined. For example, request types can include manual or automated types depending on how the request was initiated. In another example, request types can include immediate, routine, or low-priority types that indicate how quickly a response to a request is expected. In yet another example, request types can indicate a currency required for the synchronization request such that one type can require extremely current information and another can utilize slightly dated information.

In step 344, the pre-fetch data store can be queried to determine if data for handling the requests exists. If not, process 335 can jump from step 344 to step 350. If so, process 355 can proceed from step 344 to step 346. In step 346, the pre-fetch data store can be queried and data can be responsively returned that can be used in responding to the synchronization request. In step 348, a determination can be made as to whether addition information not contained within the pre-fetch data store is needed for generating a response. If not, the process 335 can proceed from step 348 to step 352. When additional information is needed, process 335 can proceed from step 348 to step 350.

In step 350, a data server or other data source can be queried for data needed to respond to the synchronization request. In step 352, a response can be generated for the requested based upon the retrieved data. In step 354, the response can be conveyed to an appropriate recipient. The appropriate recipient can be the entity, such as a synchronization client, that initiated the synchronization request. Another appropriate recipient can include an entity that receives updates from the synchronization client. It should be noted that because synchronization can be bilateral, a synchronization client can be both an update recipient and an update source. In 356, a determination can be made as to whether the request requires another data store to be updated. If not, the process 335 can end. If so, the process 335 can loop from step 356 to step 344 where the pre-fetch data store can be queried to determine if information from the update source is included in the pre-fetch data store.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computerized method for synchronizing two data stores in a three tiered synchronization system having a client, a synchronization server, and a data server, said method comprising the steps of:
   before a synchronization request is detected, the synchronization server retrieving data needed for handling the synchronization request from at least one of a data store associated with the client and a data store associated with the data server, the retrieved data comprising updated data to be synchronized between the client and the data server;
   before the synchronization request is detected, the synchronization server storing the retrieved data in a pre-fetch data store;
   detecting the synchronization request for synchronizing data within the data store of the client with data within the data store of the data server; and
   the synchronization server handling the synchronization request utilizing data for the synchronization request that was placed within the pre-fetch data store before the synchronization request was detected,
   wherein the synchronization server repeats the retrieving and storing steps in accordance with previously established pre-fetching parameters, and wherein the previously established pre-fetching parameters prioritize one set of clients over another set of clients so that repeating of the retrieving and storing steps occurs more frequently for clients having a greater priority.

2. The computerized method of claim 1, wherein the handling step further comprises the steps of:
   updating data within the data store associated with the client in accordance with data within the data store associated with the data server; and
   updating data within the data store associated with the data server in accordance with data within the data store associated with the client.

3. The computerized method of claim 2, wherein the data server is a PIM server.

4. The computerized method of claim 2, wherein the data server is a relational database server.

5. The computerized method of claim 2, wherein the data server is a form server.

6. The computerized method of claim 1, wherein the handling step further comprises the steps of:
   generating a response to the synchronizing request; and
   conveying the response to a source that initiated the synchronization request, wherein the source includes at least one of the client and the data server.

7. The computerized method of claim 6, further comprising the steps of:
   before the synchronization request is detected, determining a format for the response in accordance with the source that is to receive the response; and
   before the synchronization request is detected, formatting the retrieved data in accordance with the determined format, whereby data stored within the pre-fetch data store is pre-formatted.

8. The computerized method of claim 6, wherein the source is the client, wherein the detecting step occurs responsive to the client conveying the synchronization request to the synchronization server.

9. The computerized method of claim 6, further comprising the step of:
   the synchronization server determining whether the synchronization request is an auto-initiated request or a manually initiated request, wherein the handling step selectively performs different programmatic actions based upon the determined request type.

10. The computerized method of claim 9, wherein when the determined request type is an auto-initiated request, the synchronization server generates the response based exclusively upon data within the pre-fetch data store.

11. The computerized method of claim 9, wherein when the determined request type is a manually initiated request, the data store to which the generated response is based in part upon a querying of at least one of the data store of the client and the data store of the data server, wherein the querying is performed after the step of detecting the synchronization request.

12. The computerized method of claim 1, wherein the pre-fetching parameters are user-configurable by an authorized administrator of the synchronization server.

13. The computerized method of claim 1, wherein the previously established pre-fetching parameters are client specific parameters.

14. A three tiered data synchronization system comprising:
   a client having an associated client data store;
   an enterprise data server having an associated server data store;
   a synchronization server configured to intermittently and bi-directionally synchronize data within the client data store with data within the server data store; and
   a pre-fetch data store that maintains data needed for handling an synchronization request before the synchronization request is detected, the data being retrieved by the synchronization server from at least one of the data store associated with the client and the data store associated with the data server, the retrieved data comprising updated data to be synchronized between the client and the data server;
   wherein the synchronization server repeats the retrieving and storing of the data in accordance with previously established pre-fetching parameters, and wherein the previously established pre-fetching parameters prioritize one set of clients over another set of clients so that repeating of the retrieving and storing of the data occurs more frequently for clients having a greater priority.

15. The system of claim 14, wherein the synchronization server further comprises:
   a pre-fetch engine configured to gather and store data maintained within the pre-fetch data store; and
   a format engine configured to format data stored within the pre-fetch data store in accordance with data conventions of a data store for which the data of the pre-fetch data store is intended.

16. A machine-readable storage for handling empty update events within a three tiered synchronization system having a client, synchronization server, and data server, the machine-readable storage having stored thereon, a computer program having a plurality of code sections, said code sections executable by a machine for causing the machine to perform the steps of:
   before a synchronization request is detected, the synchronization server retrieving data needed for handling the synchronization request from at least one of a data store associated with the client and a data store associated with the data server, the retrieved data comprising updated data to be synchronized between the client and the data server;
   before the synchronization request is detected, the synchronization server storing the retrieved data in a pre-fetch data store;
   detecting the synchronization request for synchronizing data within the data store of the client with data within the data store of the data server; and
   the synchronization server handling the synchronization request utilizing data for the synchronization request that was placed within the pre-fetch data store before the synchronization request was detected,
   wherein the synchronization server repeats the retrieving and storing steps in accordance with previously established pre-fetching parameters, and wherein the previously established pre-fetching parameters prioritize one set of clients over another set of clients so that repeating of the retrieving and storing steps occurs more frequently for clients having a greater priority.

17. The machine readable storage of claim 16, wherein the handling step further comprises the steps of:
   updating data within the data store associated with the client in accordance with data within the data store associated with the data server; and
   updating data within the data store associated with the data server in accordance with data within the data store associated with the client, wherein the data server is at least one of a PIM server, a relational database server, and a form server.

18. The machine readable storage of claim 16, said code sections further causing the machine to perform the steps of:
   before the synchronization request is detected, determining a format for a response in accordance with a source that is to receive the response, wherein the source comprises at least one of the client and the data server; and
   before the synchronization request is detected, formatting the retrieved data in accordance with the determined format, wherein the handling step further comprises generating the response based upon the formatted data and conveying the response to the source.

* * * * *